United States Patent
Cascioli (10) Patent No.: US 11,720,728 B1
(45) Date of Patent: *Aug. 8, 2023

(54) VERSION TRACKING AND CONTROL FOR INTEGRATED CIRCUIT DESIGN

(71) Applicant: ARCHITECTURE TECHNOLOGY CORPORATION, Eden Prairie, MN (US)

(72) Inventor: Joseph Cascioli, Ithaca, NY (US)

(73) Assignee: ARCHITECTURE TECHNOLOGY CORPORATION, Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/480,069

(22) Filed: Sep. 20, 2021

Related U.S. Application Data (63) Continuation of application No. 16/983,727, filed on Aug. 3, 2020, now Pat. No. 11,126,767, which is a continuation of application No. 16/367,006, filed on Mar. 27, 2019, now Pat. No. 10,733,341.

(51) Int. Cl.
*G06F 30/30* (2020.01)
*H04L 9/08* (2006.01)

(52) U.S. Cl.
CPC ............ *G06F 30/30* (2020.01); *H04L 9/0819* (2013.01)

(58) Field of Classification Search
CPC ........ G06F 30/30; G06F 30/32; G06F 30/323; G06F 30/327; G06F 30/33; G06F 2117/08; H04L 9/0819
USPC ........................................................ 716/100
See application file for complete search history.

(56) References Cited

U.S. PATENT DOCUMENTS

| | | | |
|---|---|---|---|
| 8,533,642 B1 * | 9/2013 | Ogilvie ................... | G06F 30/30 716/100 |
| 8,839,162 B2 | 9/2014 | Amundson et al. | |
| 8,966,413 B2 | 2/2015 | Shacham et al. | |
| 2008/0209364 A1 * | 8/2008 | Van Ginneken ...... | G06F 30/327 716/100 |
| 2009/0158225 A1 | 6/2009 | Basappa et al. | |
| 2013/0239075 A1 | 9/2013 | Gaugler et al. | |

(Continued)

OTHER PUBLICATIONS

Cascioli, Phase I SBIR Proposal, Title: SCRIBE—Supply Chain Blockchain Enhancement, Topic Number and Name: 1 DMEA182-003—BlockChain Supply Chain Enhancement for Trusted & Assured FPGAs and ASICs, Jun. 20, 2018, 24 pages.

*Primary Examiner* — Paul Dinh
(74) *Attorney, Agent, or Firm* — Foley & Lardner LLP (57) ABSTRACT

An illustrative system may comprise a plurality of distributed network nodes hosting a two-dimensional distributed digital ledger. The distributed digital ledger may have a plurality of chains of digital blocks in the two-dimensions, wherein each chain may be associated with a particular functionality (e.g., a first set of integrated circuit processes) and a corresponding level of security. For example, a first chain in the first direction may contain digital blocks containing code differentials of the hardware description language code forming the integrated circuit design. A second chain in a second direction may contain digital blocks containing simulation data records generated during the simulation of the integrated circuit design. The first chain and the second chain may be based upon different cryptographic protocols and therefore may be cryptographically separate from each other.

20 Claims, 3 Drawing Sheets

(56) References Cited

U.S. PATENT DOCUMENTS

2014/0282309 A1 9/2014 Alfieri
2018/0359852 A1 12/2018 Geva et al.

* cited by examiner

VERSION TRACKING AND CONTROL FOR INTEGRATED CIRCUIT DESIGN

CROSS-REFERENCE TO RELATED APPLICATION

This application is a continuation of U.S. patent application Ser. No. 16/983,727, entitled "Version Control of an Integrated Circuit Design and Tracking of Pre-Fabrication, Fabrication, and Post-Fabrication Processes," filed Aug. 3, 2020, which is a continuation of U.S. patent application Ser. No. 16/367,006, entitled "Version Control of an Integrated Circuit Design and Tracking of Pre-Fabrication, Fabrication, and Post-Fabrication Processes," filed Mar. 27, 2019, now U.S. Pat. No. 10,733,341, each of which is incorporated by reference in its entirety.

TECHNICAL FIELD

This application is generally directed to integrated circuit design and fabrication and more specifically to tracking of the lifecycle of an integrated circuit through two-dimensional distributed digital ledgers.

BACKGROUND

Compared to circuits formed by discrete components, integrated circuits (IC) provide a more intense computational power while occupying less space. ICs, therefore, have become computational nerve centers of various electronic and computing devices. For example, integrated circuits form central processing units of computers, digital signal processing circuits in smartphones, and controllers in electromechanical devices. With the rapid proliferation of system on a chip devices in the past several years, ICs have been even more prevalent in various devices.

ICs have incredibly complex micro-structures containing millions, if not billions, of transistors. Because of this sheer complexity of the ICs, it takes several technical stages and several entities to manufacture a fabricated IC. To follow the typical IC processes, an IC begins as a hardware description language code. The code, after undergoing several iterations, may be compiled to form an IC design. The IC design's function may be simulated using a software simulator and its hardware behavior may be emulated using a hardware emulator. After the IC design passes the rule checks in the simulation and/or the emulation processes, an IC may be fabricated using the IC design. The IC may then be tested sending various test signals to the fabricated IC and observing the fabricated IC's response to the test signals. These complex and varied operations, often requiring varying degrees of specialization, are not performed by a single entity or hardware/software tools generated by a single entity. For example, IC design and simulation may be performed by a first entity using a software suite provided by a second entity. A third entity may fabricate the IC using tools manufactured by a fourth entity.

With these entities and the corresponding IC processes scattered throughout the globe, deliberate insertion of hardware vulnerabilities and the subsequent exploitation thereof have been exceedingly common. For example, a foreign foundry may add embedded circuits—not a part of the original design—to an IC and a malicious actor may use those embedded circuits to monitor or influence the behavior of the IC when it is in use. These so called hardware bugs are harder to detect than the software bugs.

Therefore, a significant improvement is desired for a secured tracking of these diverse IC processes performed diverse entities.

SUMMARY

What is therefore desired are systems and methods that provide a secure and integrated tracking of IC processes throughout the lifecycle of an IC. What is further desired are systems and methods that provide varying level of security based on the IC processes and entities performing the IC processes.

Embodiments described herein attempt to solve the aforementioned technical problems and may provide other solutions as well. An illustrative system may comprise a plurality of distributed network nodes hosting a two-dimensional distributed digital ledger. The distributed digital ledger may have a plurality of chains of digital data blocks (also referred to as digital blocks) in the two-dimensions, wherein each chain may be associated with a particular functionality (e.g., a first set of IC processes) and a corresponding level of security. For example, a first chain in the first direction may contain digital blocks containing code differentials of the hardware description language code forming the integrated circuit design. A second chain in a second direction may contain digital blocks containing simulation data records generated during the simulation of the integrated circuit design. The first chain and the second chain may be based upon different cryptographic protocols and therefore may be cryptographically separate from each other.

In one embodiment, a computer-implemented method comprises retrieving, by a network node in a plurality of distributed network nodes, code differentials between successive iterations of an integrated circuit design in a hardware description language; iteratively generating, by the network node, a first plurality of digital blocks for a first chain in a first direction within a two-dimensional distributed digital ledger hosted by the plurality of distributed network nodes, the first plurality of digital blocks containing hashes of corresponding code differentials generated by the network node using a first hashing protocol associated with a first level of security; retrieving, by the network node, a plurality of simulation data records generated through successive simulation operations on the integrated circuit design; iteratively generating, by the network node, a second plurality of digital blocks for a second chain in a second direction within the two-dimensional distributed ledger, the second plurality of digital blocks containing hashes of corresponding simulation data records generated by the network node using a second hashing protocol using a second level of security, such that the second chain is cryptographically separate from the first chain; associating, by the network node, the first plurality of digital blocks and the second plurality of digital blocks to a physically unclonable function in an integrated circuit fabricated from the integrated circuit design; in response to the network node receiving a first query containing the physically unclonable function from a first user with first level security credentials: displaying, by the network node, the code differentials of the integrated circuit design; and in response to the network node receiving a second query containing the physically unclonable function from a second user with second level security credentials: displaying, by the network node, the plurality of simulation data records of the integrated circuit design.

In another embodiment, a system comprises a plurality of distributed network nodes; a network node of the plurality of distributed nodes, the network node configured to: retrieve code differentials between successive iterations of an integrated circuit design in a hardware description language; iteratively generate a first plurality of digital blocks for a first chain in a first direction within a two-dimensional distributed digital ledger hosted by the plurality of distributed network nodes, the first plurality of digital blocks containing hashes of corresponding code differentials generated by the network node using a first hashing protocol associated with a first level of security; retrieve a plurality of simulation data records generated through successive simulation operations on the integrated circuit design; iteratively generate a second plurality of digital blocks for a second chain in a second direction within the two-dimensional distributed ledger, the second plurality of digital blocks containing hashes of corresponding simulation data records generated by the network node using a second hashing protocol using a second level of security, such that the second chain is cryptographically separate from the first chain; associate the first plurality of digital blocks and the second plurality of digital blocks to a physically unclonable function in an integrated circuit fabricated from the integrated circuit design; in response to the network node receiving a first query containing the physically unclonable function from a first user with first level security credentials: display the code differentials of the integrated circuit design; and in response to the network node receiving a second query containing the physically unclonable function from a second user with second level security credentials: display the plurality of simulation data records of the integrated circuit design.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The accompanying drawings constitute a part of this specification and illustrate embodiments of the subject matter disclosed herein.

DETAILED DESCRIPTION

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

IC processes for design, fabrication, and deployment of ICs are associated with diverse types of computing systems. An IC typically starts as a hardware description language (HDL) code. The HDL code may undergo several versions before the code is finalized. A software simulator may then compile the finalized code to generate an IC design and perform software simulation operations on the IC design. The software simulation processes may include the software simulator capturing a plurality of parameters within the IC design based upon a corresponding plurality of software triggers provided to the IC design. The software simulation processes may verify that the IC design shows expected/correct simulation behavior.

The IC design may also be compiled into an emulator to capture the hardware behavior of the IC design. The emulator may include a plurality of processor clusters that collectively emulate the hardware behavior the IC design. Therefore the emulator with the compiled design may connect to a target system such that the IC design being emulated receives input from the target system and provides corresponding output to the target system. For example, if the IC design is that a graphics processing unit (GPU), the target system may be a motherboard that will receive the GPU after fabrication of the IC design. The emulator may therefore have the same connectivity to the target system as the fabricated IC will have. A monitor in the emulator may observe the behavior of the IC design based on the hardware triggers received from the target system. Based on the observed behavior, the monitor (or a designer) may determine whether the IC design shows an expected/correct hardware behavior.

Once the IC design shows the expected behavior during the simulation processes and/or the emulation processes, the IC design may be sent to a foundry for fabrication. The foundry may use third party hardware and software tools to fabricate an IC (e.g., within a physical chip) from the IC design. For fabrication, the foundry may have its own IC processes such as adjustment of the IC design through software and the hardware fabrication processes. In addition to the circuit components in the IC design, the foundry may add other components into the fabricated IC. For example, the IC may add component to receive and distribute power within the IC. As another example, the foundry may add other circuits in addition to the main IC specified by the IC design. The foundry may further have testing IC processes to verify the functionality of the fabricated IC. In addition to the foundry, other entities may also perform the hardware testing IC operations.

After fabrication, the ICs may be shipped to various locations for their use in devices. For example, an IC may be a CPU that is shipped to a laptop assembling plant. The laptop assembling plant may then solder the IC into a laptop's motherboard and test the functionality of the laptop. As another example, an IC may be a controller for a heavy machinery. The IC may be shipped to the heavy machinery manufacturing plant to be added to a corresponding heavy machinery. It should be understood that the term IC used throughout the specification include any form of integrated circuit including field programmable gate arrays (FPGAs), microprocessors, memory circuits, signal processors, and/or any other form of integrated circuit.

Embodiments disclosed herein describe systems and methods for tracking these varied IC processes performed by a plurality of diverse entities such the origin of any IC can be traced. An illustrative computer may use a two-dimensional distributed digital ledger for such tracking. The illustrative computer itself may be a network node of a plurality of network nodes hosting the two-dimensional digital ledger. The two-dimensional distributed digital ledger may support multiple chains in any dimension. For example, the two-dimensional distributed digital ledger may have a first set of chains in a first direction (e.g., an x-direction) and a second set of chains in a second direction (e.g., a y-direction). Each chain may be associated with a corresponding level of security. For example, the computer may use a first hashing protocol for a first level of security in a first chain in the first direction and a second hashing protocol for a second level of security in a second chain in the second direction. The level of security may be based on the criticality of the IC processes tracked using the corresponding chain.

As an example of tracking IC processes, the computer may provide a version control system within a first chain of the distributed digital ledger. As the hardware description language (HDL) code changes through the different versions, the computer may retrieve the code differentials. For example, each time there is a change in the code, the computer may query the code repository to retrieve the corresponding code differential. The computer may then generate a hash of the code differential and upload the hash to the chain of the distributed digital ledger. Additionally, the computer may upload an encrypted version of the code differential along with the hash. As the versions of the code change, the computer may iteratively generate the hashes of the code differentials and upload them to the chain in the distributed digital ledger. Therefore, the computer may provide a blockchain based version control system for the HDL code of the IC design.

The computer may also track the simulation processes using a second chain within the two-dimensional distributed digital ledger. The computer may receive simulation data records from one or more simulation computers and generate hashes of the simulation data records using a hashing protocol and append these hashes to the second chain. The hashing protocol for the simulation data records may be different from the hashing protocol used for the code differentials. Using the different hashing protocols, the computer may implement a different level of security based on the hashing protocols. The computer may also track the emulation processes using a third chain within the distributed digital ledger. The computer may receive emulation data records from one or more emulation computers (e.g., emulators) and generate hashes of the emulation data records using a corresponding hashing protocol. The computer may then append these hashes to the third chain.

Using a fourth chain within the distributed digital ledger, the computer may track foundry processes. The computer may receive fabrication data records generated by one or more computers implementing the foundry process and generate the hashes of the fabrication data records using a corresponding hashing protocol. The computer may then append the hashes to the fourth chain. Using a fifth chain within the distributed digital ledger, the computer may track the IC shipping processes. In particular, the computer may generate hashes of one or more shipping data records associated with the IC and append the hashes to the fifth chain.

Figure 1:
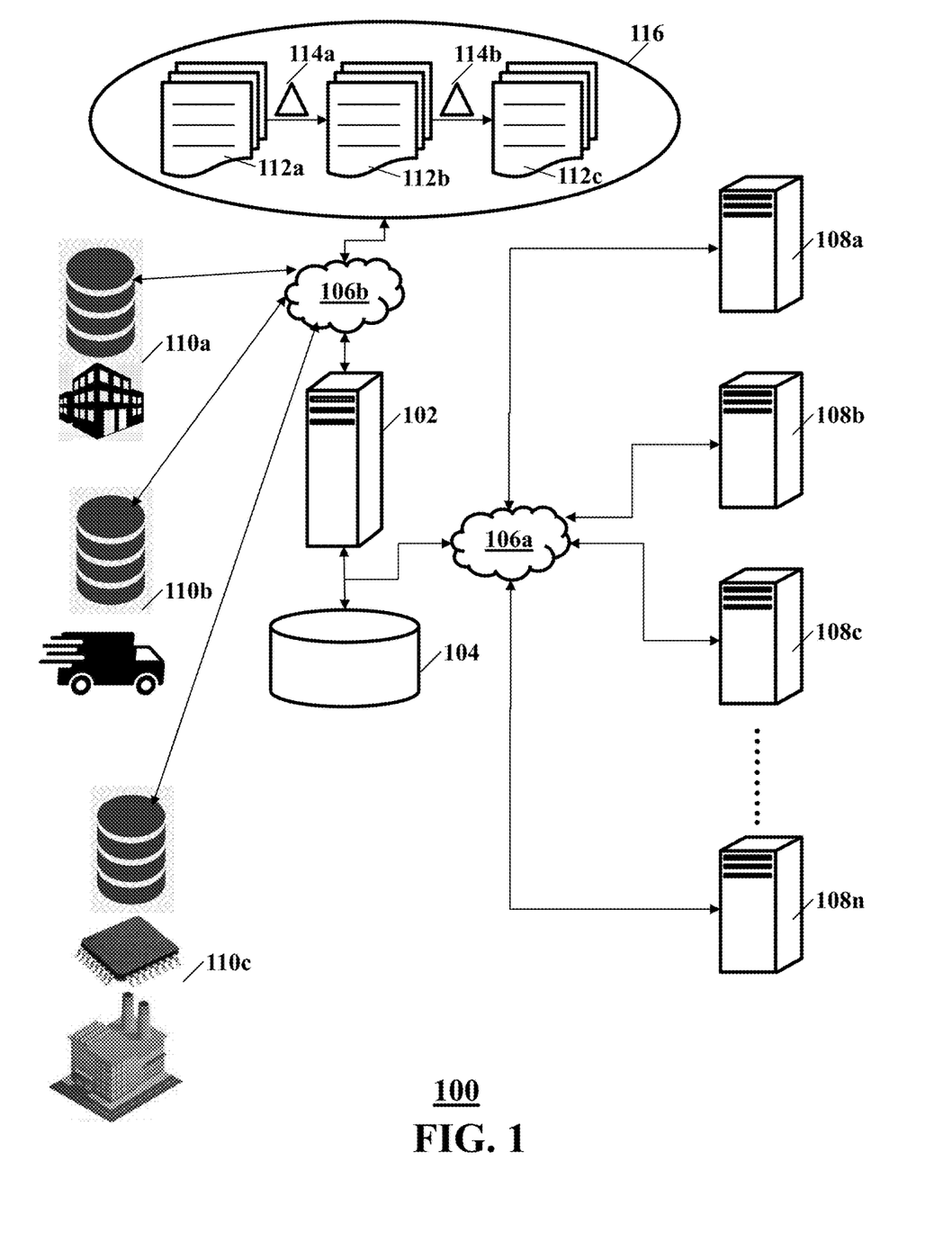
FIG. 1 shows an illustrative network environment for version control of IC design and secure tracking of IC processes, according to an embodiment.

For each particular IC, the computer may associate the tracking information in the various chains with a physically unclonable function (PUF) in the IC. Therefore, the PUF may be associated with different chains in different directions in the distributed digital ledger, wherein each chain have a corresponding security level. Using the PUF, a user with a set of user credentials may access a corresponding chain in the distributed digital ledger and gather the provenance information of the IC. The PUF may be a code based upon the microstructure of the IC. It should be understood that the PUF is used here as an illustration and other tracking or unique codes in the etched to or otherwise attached to the IC should be considered within the scope of this disclosure FIG. 1 shows an illustrative network environment 100 for version control of an integrated circuit (IC) design and tracking pre-fabrication and post-fabrication processes, according to an embodiment. As shown, the illustrative network environment 100 may comprise an application server 102; a database 104; networks 106a-106b (collectively or commonly referred to as 106); distributed network nodes 108a-108n (collectively or commonly referred to as 108); entities 110a-110c (collectively or commonly referred to as 110) associated with prefabrication, fabrication, and/or post-fabrication processes; and an IC design platform 116. It should be understood that the aforementioned components are merely illustrative and additional, alternate, and fewer number of components are to be considered within the scope of this disclosure.

The application server 102 may be any kind of computing device including, but not limited to, a server computer, a desktop computer, a laptop computer, a tablet computer, and a smartphone. At minimum, the application server 102 may comprise a processor for executing a plurality of computer program instructions and a memory that the processor can read from and write into. The applications server 102 may further comprise a storage for storing the computer program instructions and results generated by the processor executing the computer program instructions.

The database 104 may be any kind of database storing any type of data records described throughout this disclosure. The database 104 may be maintained at separate database servers or may be integrated within the application server 102 itself. Non-limiting examples of the date records stored in the database 104 include two-dimensional distributed digital ledger blocks, hardware description language codes and the differentials thereof, simulation data records, emulation data records, post-fabrication testing data records, shipping data records, and/or any other type of data records. The database 104 may be relational or non-relational. The database 104 may provide an application programming interface for one or more components of the network environment 100 to access the contents of the database 104.

The networks 106 may include any type of network providing communication channels between the various components within the network environment 100. The networks 106 may include wired networks, wireless networks, and/or a combination thereof. Non-limiting examples of the networks 106 may include a local area network (LAN), metropolitan area network (MAN), wide area network (WAN), and the Internet. Although two separate networks 106a, 106b are shown in FIG. 1, this is for illustration only, and the shown networks 106a, 106b may be the same network.

Each of the distributed network nodes 108 may be any kind of computing device executing the functionality of hosting a two-dimensional distributed digital ledger. Non-limiting examples of the distributed network nodes 108 may include a server computer, a desktop computer, a tablet computer, and a smartphone. At minimum, a distributed network node 108 may comprise a processor for executing a plurality of computer program instructions and a memory that the processor can read from and write into. The distributed network node 108 may further comprise a storage for storing the computer program instructions and results generated by the processor executing the computer program instructions. It should be understood that the application server 102 may also be considered a node within the distributed network formed by the distributed network nodes 108. In some embodiments, the two-dimensional distributed digital ledger may be a private party blockchain. In other embodiments, the two-dimensional distributed digital ledger may be a public blockchain.

The entities 110a-110c may be any entity associated pre-fabrication, fabrication, and/or post-fabrication processes (also referred to as operations) of an IC. Each of the entities 110 may include respective computing systems and databases that may communicate with other components within the network environment 100. As an illustration, FIG. 1 shows an entity 110a performing pre-fabrication operations. For instance, the entity 110a may perform compilation operations of an integrated circuit design and simulation and/or emulation operations of the compiled design. The simulation may include software based simulation wherein software test instructions are provided to the compiled design and behavior of the compiled design is observed. Simulation operations may be used for debugging the integrated circuit design based upon the simulation results. The entity 110a may provide a plurality of simulation data records to the application server 102. The simulation data records may include state of the various circuit elements in the integrated circuit design, error messages, debug operations, modifications to the integrated circuit design, and/or any other type of simulation data records.

Entity 110a may also perform emulation operations on the integrated circuit design. The emulation operations may use one or more hardware emulators where the integrated circuit design may be compiled and loaded to. The hardware emulators may emulate the hardware behavior of the integrated circuit design. In other words, when the integrated circuit design is loaded into the hardware emulator, the hardware emulator attempts to mimic post-fabrication behavior of the integrated circuit design. The hardware emulator is therefore connected to an electronic device (target device) or an electronic system (target system) that the integrated circuit may be attached to after fabrication. For example, if the integrated circuit design is that of a graphics processing unit (GPU), the device the hardware emulator is connected may be a motherboard or a graphics card that the integrated circuit will be installed on post-fabrication. Based on the emulation, the entity 110a may generate emulation data records and provide the same to the application server 102. The emulation data records may include identifying information of the emulator, identification and type of the target device or target system, states of various circuit components of the integrated circuit design during emulation, error messages generated during emulation, debug operations, modifications to the integrated circuit design during emulation, and/or any other type of emulation data records.

As another example, entity 110c may perform fabrication operations to generate an integrated circuit from the integrated circuit design. For example, the entity 110c may be a foundry for manufacturing integrated circuits based upon provided integrated circuit design. The entity 110c may generate fabrication data records and provide the same to the application server 102 through the network 106b. The fabrication data records may include, for example, identification of the entity 110c, identifying information of the machinery used to fabricate the integrated circuit, batch number of the integrated circuit, fabrication date, serial number of the integrated circuit, and/or any other type of fabrication data records.

As yet another example, entity 110b may be associated with shipping and distributing the fabricated IC. One or more computers associated with entity 110b may therefore generate shipping data records. The shipping data records may include the source information, destination information, and/or route information. The application server 102 may retrieve the shipping data records from the one or more computers associated with the entity 110b.

The IC design platform 116 may include a plurality of computers providing software tools for designing an IC through one or more hardware description languages (HDLs). Non-limiting examples of HDLs include VHDL (VHSIC Hardware Description Language) and Verilog. The IC design platform 116 may provide an interface for IC designers to generate and modify the HDL code forming the IC design. The HDL code may undergo multiple iterations or multiple versions. As shown, there may be a first version of the HDL code 112a, a second version 112b, and a third version 112c. It should be understood that the three versions 112a-112c as described herein are merely illustrative and there may be multiple versions of the HDL code.

Between the first version 112a and the second version 112b, there may be a first code differential 114a. In other words, the first code differential 114a may include the changes between the first version 112a and the second version 112b. Similarly, there may a second code differential 114b between the second version 112b and the third version 112c. The second code differential 114 may include the changes between the second version 112b and the third version 112c.

In an illustrative operation, the IC design platform 116 may transmit the code differentials 114a, 114b to the application server 102. The application server 102 may then generate the hashes of the code differentials 114a, 114b and append the hashes to a chain in the two-dimensional distributed digital ledger. The application server 102 may store the original (non-hashed) code differentials 114a, 114b in the database 104. In some embodiments, the application server 102 may store encrypted versions of the code differentials 114a, 114b in the two-dimensional distributed digital ledger in addition to or as an alternate to string the same in the database 104. For updating the two-dimensional distributed ledger with code differentials (e.g., appending digital blocks with the code differentials or hashes thereof), the distributed network nodes 108 may use a consensus protocol such as a Practical Byzantine Fault Tolerance (PBFT). In addition to the code differentials, the application server 102 may store the timestamp of the code differentials 114a, 114 (e.g., when the code was modified) and the identities of one or more designers who generated the code differentials. As with the aforementioned operation, the application server 102 may append the hashes of the timestamps and the identities in the two-dimensional digital ledger and store the original values in the database 104. In some embodiments, the application server 102 may store the encrypted versions of the original values in the two-dimensional digital ledger itself.

Figure 2:
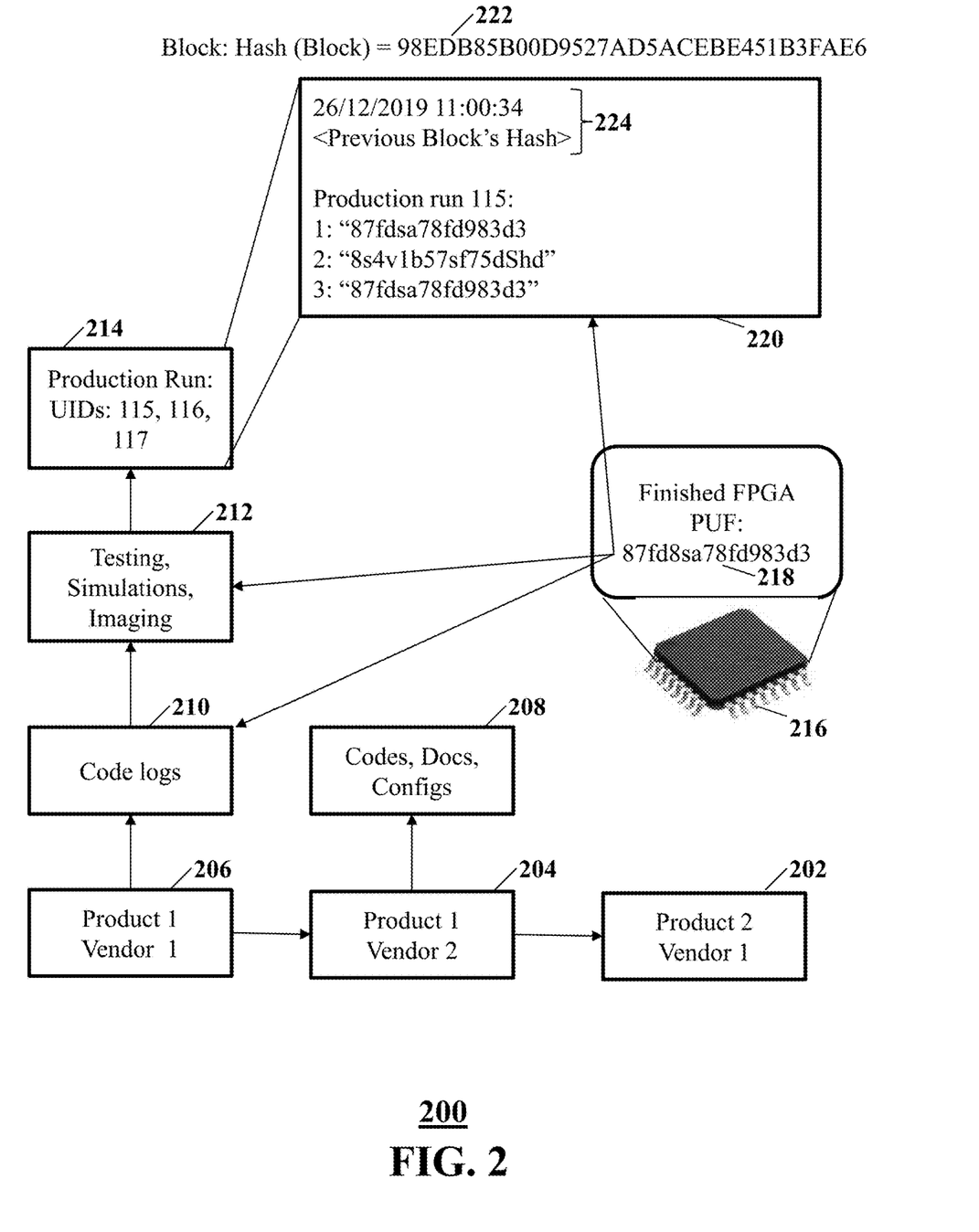
FIG. 2 shows an illustrative two-dimensional distributed digital ledger, according to an embodiment.

FIG. 2 shows an illustrative two-dimensional distributed digital ledger 200, according to an embodiment. The two-dimensional distributed digital ledger 200 may be hosted by a plurality of distributed network nodes, such as the distributed network nodes 108 shown in FIG. 1. The two-dimensional dimensional distributed digital ledger may include digital blocks in two dimensions. For example, a first set of digital blocks 202, 204, 206 may be arranged in an x-direction. A second set of digital blocks 204, 208 may be arranged in a y-direction. A third set of digital blocks 206, 210, 212, 214 may also be arranged in the y-direction. It should be further be understood that the two-dimensional distributed digital ledger 200 is merely for illustration. Other multi-dimensional distributed ledgers should also be considered within the scope of this disclosure. Furthermore, it should be understood that the two-dimensional distributed digital ledger 200 may be a portion of a private party blockchain or a public blockchain.

As described above, the two-dimensional distributed digital ledger 200 may contain digital blocks 202, 204, 206, 208, 210, 212, 214. Each of the digital blocks 202, 204, 206, 208, 210, 212, 214 may include tracking and/or version control information of an integrated circuit (IC) 216. For example, the first set of digital blocks 202, 204, 206 may containing tracking information of various products used in the IC 216 and the corresponding vendors. A first digital block 202 may contain information about product 2 from provided by vendor 1; a second digital block 204 may contain information about product 1 provided by vendor 2; and a third digital block 206 may contain information about product 1 provided by vendor 1. The hashes of the blocks 202, 204, 206 may provide the connectivity between these blocks. As shown, the direction of connectivity in the chain formed by the digital blocks 202, 204, 206 is from the digital block 206 to digital block 204 to digital block 202. Therefore, the digital block 204 may include a hash of the content of the digital block 206, and the digital block 202 may include a hash of the content of the digital block 204. These hashes may be based upon a first hashing protocol. Non-limiting examples of the first hashing protocol may include SHA-256 and SHA-512. Furthermore, information in the digital blocks 202, 204, 206 may be encrypted using a first encrypting protocol. The first hashing protocol and/or the first encrypting protocol may therefore provide a first level of security to the contents of the chain formed by the digital blocks 202, 204, 206.

Digital blocks 204, 208 may form a second chain within the two-dimensional distributed digital ledger 200. The second chain may store additional information about product 1 provided by vendor 2. For example, digital block 208 may contain codes, documents, and/or configuration files associated with product 1 as provided by vendor 2. The direction of connectivity in the second chain may be from digital block 204 to digital block 208. Therefore, digital block 208 may include a hash of the content of the digital block 204. The hashing may be based upon a second hashing protocol such as SHA-256 or SHA-512. Furthermore, the content may be encrypted based upon a second encryption protocol. The second hashing protocol and/or the second encryption protocol may therefore provide a second level of security to the second chain.

Digital blocks 206, 210, 212, 214 may form a third chain in the y-direction. The third chain may capture various stages of manufacturing of the IC 216. As shown, the direction of the direction of connectivity in the third chain may be from digital block 206 to digital block 210 to digital block 212 and to digital block 214. As the IC 216 moves through various stages of the manufacturing process, the two-dimensional distributed ledger 200 may capture and store the various manufacturing steps. Digital block 206 may first store product 1 provided by vendor 1. Product 1 may be a computer used to generate a HDL code forming the design of the IC 216. Digital block 210 may capture the code logs of the HDL code. For example, the digital block 210 may capture one or more code differentials when as the HDL code moves through successive versions. Digital block 212 may capture the data records associated with testing, simulation, and imaging operations associated with the design of the IC 216. Furthermore, digital block 214 may capture information of the production run of the manufacture of the IC 216. As shown, the digital block 214 may capture three production runs associated unique identifiers (UIDs) 115, 116, and 117. It should be understood that there may multiple ICs associated each production run.

An illustrative content of the digital block 214 is shown as block content 220. As shown, the block content 220 may include a hash 224 of the previous digital block (here, the previous digital block is digital block 212). The hash 224 may therefore indicate the directional combination between the digital block 212 and the digital block 214. It should be understood that corresponding may indicate the directional relationship between digital blocks 206, 210 and digital blocks 210, 212. Block content 220 may further contain the PUFs of the ICs manufactured during the production runs. As shown, block content 220 may contain PUFs associated with production run identified by UID 115. One of the PUFs of the production run may be of the IC 216. A hash 222 of the block content may be generated for the digital block subsequent to the digital block 214.

Therefore, using a PUF 218 associated with the IC 216, one can access one of more digital blocks of the two-dimensional distributed digital ledger 200 to retrieve the information associated with design and production of the IC 216. As described above, the two-dimensional distributed digital ledger 200 may maintain a plurality of chains of digital blocks for various IC processes associated with the IC 216. Each chain may have corresponding level of security to allow a selective access to the information stored in the two-dimensional distributed digital ledger and/or associated local databases. For example, the chain formed by digital blocks 202, 204, 206 may have a lower security level compared to the chain formed by the digital blocks 206, 210, 212, 214. Therefore a user with a lower level security credentials may access the information about the different products provided by different vendors but many not be access the information associated with code generation, testing, simulation, imaging, and production runs of the IC 216 and captured by the digital blocks 206, 210, 212, 214. The information in this chain may only be provided to a user with higher level security credentials.

Figure 3:
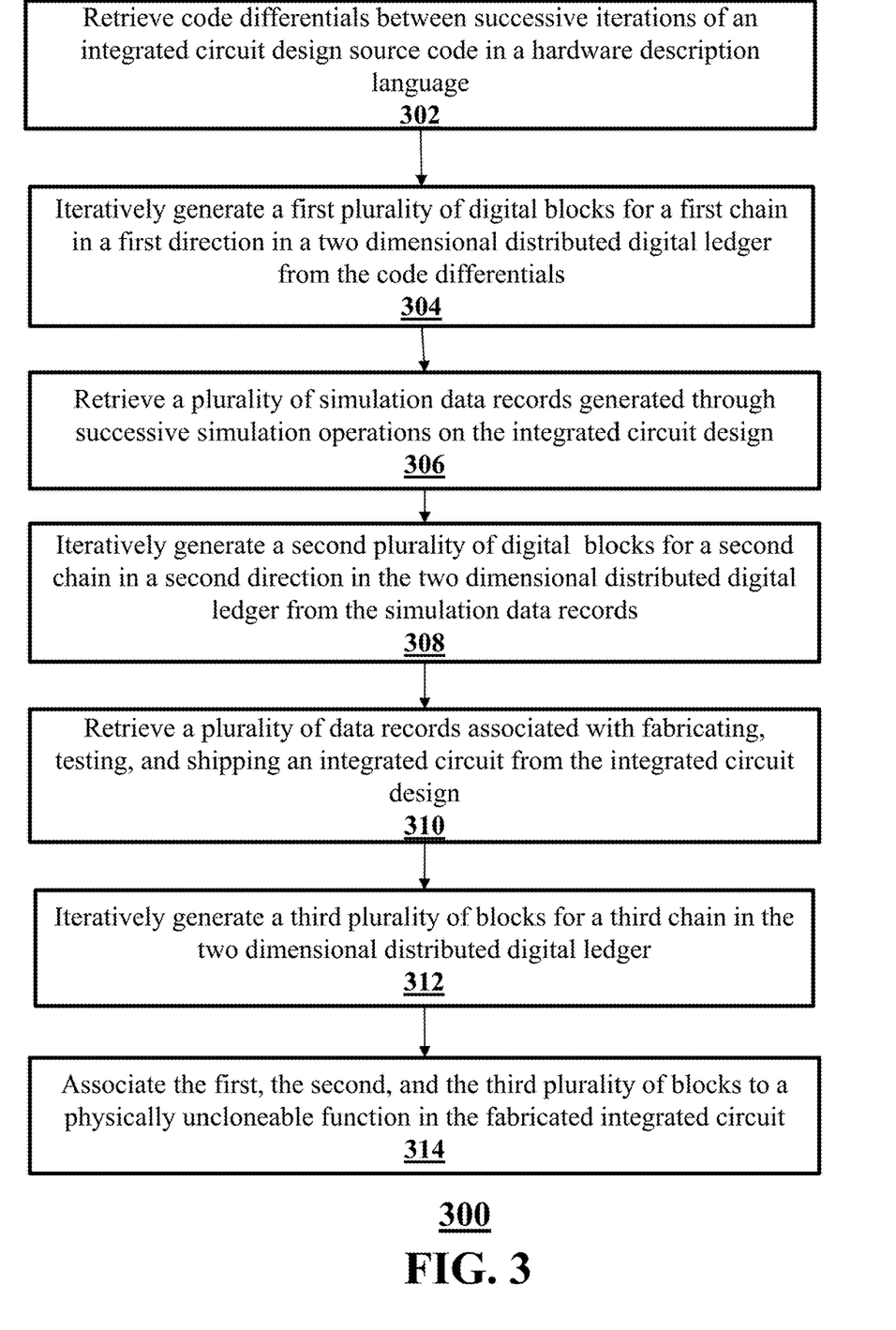
FIG. 3 shows an illustrative method of version control of IC design and secure tracking of IC processes, according to an embodiment.

FIG. 3 shows a flow diagram of an illustrative method 300 of HDL code version control and tracking IC processes, according to an embodiment. It should be understood that the steps shown in FIG. 3 and described herein are more illustrative and additional, alternate, or fewer number of steps should be considered within the scope of this disclosure. Although multiple computers may execute one or more of these illustrative steps, the following describes, for brevity, a single computer executing the steps. The computer may be a part of distributed network nodes hosting a two-dimensional distributed digital ledger.

The method may begin at step 302, wherein the computer may retrieve code differentiations between successive iterations of integrated design (IC) source code in a hardware description language (HDL). The computer may, for example, communicate with a HDL coding platform used by IC designers to generate and modify the HDL code of the IC design. The HDL coding platform may include hardware and software suites for the circuit designers to type and edit HDL codes forming the IC design. The coding process iterative and the code may undergo several versions with each successive version containing a code differential compared to the previous version. The computer may retrieve such code differentials from the HDL coding platform. In addition to the code differentials, the computer may retrieve the timestamps associated with the code differentials and identities of one or more hardware designers generating the code differentials.

At a next step 304, the computer may iteratively generate a first plurality of blocks for a first chain in a first directional in the two-dimensional distributed digital ledger from the code differentials. For example, during a first iteration, the computer may generate a first digital block from a first code differential between two versions of the HDL code. The computer may then append the first digital block to the first chain. In addition to the first code differential, the computer may generate the first digital block from a first timestamp associated with the first code differential and identities of one or more hardware designers generating the first code differential. The computer may further generate a second digital block from a second code differential from two versions of the HDL code subsequent to the aforementioned two versions. In addition to the second code differential, the computer may generate the second digital block from a second timestamp associated with the second code differential and identities of one or more hardware designers generating the second code differential. The computer may then append the second digital block to the first chain. Therefore, the computer successively receive the code differentials as the HDL code progresses through the versions. The computer may use a first hashing protocol while appending the code differentials to the first chain of the two-dimensional distributed digital ledger. For example, the computer may include hashes of the code differentials in the digital blocks and store the original code differentials in a local off-chain database. The computer may also use these hashes to maintain the connectivity between the successive digital blocks in the first chain. For example, a digital block in the first chain may include a hash of a previous block.

In some embodiments, the computer may include the code differentials in the digital blocks. The computer may use an encryption protocol to encrypt the code differentials store in the digital blocks. The selection of hashing protocols and/or the cryptographic protocols may therefore provide a first level of security for the information stored in the first chain.

At a next step 306, the computer may receive a plurality of simulation data records generated through successive simulation operations (also referred to as simulation processes) on the IC design. The simulation data records may be generated by one or more software simulators deployed to simulate the IC design. The simulation data records may include the simulation trigger inputs to the IC design being simulated and the outputs generated by the IC design during simulation.

At a next step 308, the computer may iteratively generate a second plurality of blocks for a second chain in a second direction in the two-dimensional distributed digital ledger from the simulation data records. The computer may generate the hashes of the simulation data records, generate digital blocks containing the hashes and append the digital blocks to the second chain of the two-dimensional digital ledger. In some embodiments, the computer may store the original simulation data records (e.g., non-hashed data records) in the off-chain storage. In other embodiments the computer may sored encrypted original data records in in the blockchain. The computer may use a hashing protocol and/or an encryption protocol commensurate with the level of security desired for the second chain. For example, if the second chain should be more secure than the first chain, the computer may use a more sophisticated hashing protocol and/or encryption protocol compared to the same used in the first chain.

At a next step 310, the computer may retrieve a plurality of data records associated with fabricating, testing, and shipping an IC from the IC design. The computer may retrieve these data records from a plurality of sources. For example, the computer may retrieve fabrication data records from a one or more foundry computers. The computer may retrieve the testing data records from one or more computers that may run testing operations on the fabricated IC. The computer may retrieve the shipping data records from one or more computers associated with shipping. For example, such computer may be belong to shipping or logistic entity keeping track of shipping operations.

At a next step 312, the computer may iteratively generate a third plurality of blocks for a third chain in the two-dimensional digital ledger. The computer may iteratively generate the third plurality of digital blocks from the plurality of data records associated with fabricating, testing, and shipping of the integrated circuit. In some embodiments, the computer may hash these data records using a hashing protocol and store the hashes in the digital blocks while storing the original records in off-chain local database. In other embodiments, the computer may store encrypted original data records in the blockchain. As with step 308, the computer may select the hashing protocol and/or the encryption protocol commensurate with the level of security desired for the third chain.

At a next step 314, the computer may associate the first, the second, and third plurality of digital blocks to a physically unclonable function (PUF) in the fabricated integrated IC. For example, a digital block in the two-dimensional distributed digital ledger may include the PUF associated with the IC. Such digital block may comprise pointers and/or any other type of references to the digital blocks containing various tracking information associated with the IC. Therefore, by using the PUF, one can access the data records associated with the IC processes beginning from HDL code all the way to fabrication and shipping. It should however be understood that the computer may control the access to the data based upon the level of security credentials received from a user attempting to access the tracking information. In response to an access request, the computer may retrieve and display the corresponding information. For example, in response to receiving a first query containing the PUF from a first user with first level security credentials, the computer may display the code differentials of the integrated circuit design. As another example, in response receiving a second query containing the PUF from a second user with second level security credentials, the computer may display the plurality of simulation data records of the integrated circuit design.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
generating, by a computer, a multi-dimensional distributed ledger for an integrated circuit (IC) design defined by hardware description language code, the multi-dimensional distributed ledger having a first chain in a first direction and a second chain in a second direction;
detecting, by the computer, a code differential in the hardware description language code defining the IC design;
appending, by the computer, a first digital block containing the code differential to the first chain in the first direction of the multi-dimensional distributed ledger;
generating, by the computer, a data record based upon a simulation of the IC design using the hardware description language code with the code differential; and
appending, by the computer, a second digital block containing the data record to the second chain in the second direction of the multi-dimensional distributed ledger.

2. The method according to claim 1, further comprising:
generating, by the computer, an association between a physically unclonable function (PUF) for an IC of the IC design and the multi-dimensional distributed ledger comprising the first digital block in the first chain and the second digital block in the second chain; and
providing, by the computer, responsive to a query including the PUF from a user with a security credential associated with the code differential, information associated with the code differential from the first digital block in the first chain of the multi-dimensional distributed ledger.

3. The method according to claim 2, further comprising providing, by the computer, responsive to a query including the PUF from a user with a security credential associated with the simulation, information associated with the data record from the second digital block in the second chain of the multi-dimension distributed ledger.

4. The method according to claim 2, further comprising displaying, by the computer responsive to a query including the PUF from a user, information associated with at least one of the code differential or the data record from the simulation.

5. The method according to claim 2, further comprising generating, by the computer, a digital block to include the PUF associated with an IC of the IC design in the multi-dimensional distribution ledger.

6. The method according to claim 1, further comprising:
identifying, by the computer, a second data record from at least one of fabrication, testing, or shipping of an IC from the IC design; and
appending, by the computer, responsive to identifying the second data record, a third digital block to a third chain in a third direction of the multi-dimensional distributed ledger.

7. The method according to claim 1, further comprising:
compiling, by the computer, the hardware description language code for the IC design to perform to generate code for simulation; and
using, by the computer, the code on a target system to perform the simulation of the IC and to acquire behavior information from the simulation, the behavior information to be included in the second data block.

8. The method according to claim 1, wherein appending the first digital block further comprises using a first cryptographic protocol associated with a first level of security to generate the first digital block, the first cryptographic protocol different from a second cryptographic protocol associated with a second level of security used to generate the second digital block.

9. The method according to claim 1, wherein appending the first digital block further comprises using a first hash value to maintain connectivity within the first chain in the first direction, the first hash value different from a second hash value used to maintain connectivity within the second chain.

10. The method according to claim 1, wherein the first data block includes a timestamp corresponding to the code differential and an identity of at least one IC designer for the code differential.

11. A system comprising:
a computer having one or more processors coupled with memory, configured to:
generate a multi-dimensional distributed ledger for an integrated circuit (IC) design defined by hardware description language code, the multi-dimensional distributed ledger having a first chain in a first direction and a second chain in a second direction;
detect a code differential in the hardware description language code defining the IC design;
append a first digital block containing the code differential to the first chain in the first direction of the multi-dimensional distributed ledger;
generate a data record based upon a simulation of the IC design using the hardware description language code with the code differential; and
append a second digital block containing the data record to the second chain in the second direction of the multi-dimensional distributed ledger.

12. The system according to claim 11, wherein the computer is further configured to:
generate an association between a physically unclonable function (PUF) for an IC of the IC design and the multi-dimensional distributed ledger comprising the first digital block in the first chain and the second digital block in the second chain; and
provide, responsive to a query including the PUF from a user with a security credential associated with the code differential, information associated with the code differential from the first digital block in the first chain of the multi-dimensional distributed ledger.

13. The system according to claim 12, wherein the computer is further configured to provide, responsive to a query including the PUF from a user with a security credential associated with the simulation, information associated with the data record from the second digital block in the second chain of the multi-dimension distributed ledger.

14. The system according to claim 12, wherein the computer is further configured to display, responsive to a query including the PUF from a user, information associated with at least one of the code differential or the data record from the simulation.

15. The system according to claim 12, wherein the computer is further configured to generate a digital block to include the PUF associated with an IC of the IC design in the multi-dimensional distribution ledger.

16. The system according to claim 11, wherein the computer is further configured to
identify a second data record from at least one of fabrication, testing, or shipping of an IC from the IC design; and
append, responsive to identifying the second data record, a third digital block to a third chain in a third direction of the multi-dimensional distributed ledger.

17. The system according to claim 11, wherein the computer is further configured to
compile the hardware description language code for the IC design to perform to generate code for simulation; and
use the code on a target system to perform the simulation of the IC and to acquire behavior information from the simulation, the behavior information to be included in the second data block.

18. The system according to claim 11, wherein the computer is further configured to use a first cryptographic protocol associated with a first level of security to generate the first digital block, the first cryptographic protocol different from a second cryptographic protocol associated with a second level of security used to generate the second digital block.

19. The system according to claim 11, wherein the computer is further configured to use a first hash value to maintain connectivity within the first chain in the first direction, the first hash value different from a second hash value used to maintain connectivity within the second chain.

20. The system according to claim 11, wherein the first data block includes a timestamp corresponding to the code differential and an identity of at least one IC designer for the code differential.

* * * * *